United States Patent
Deiretsbacher et al.

(10) Patent No.: US 10,455,060 B2
(45) Date of Patent: Oct. 22, 2019

(54) METHOD AND APPARATUS FOR EXPANDING TRANSACTIONS IN OPC UA

(71) Applicant: SIEMENS AKTIENGESELLSCHAFT, München (DE)

(72) Inventors: Karl-Heinz Deiretsbacher, Effeltrich (DE); Markus Erlmann, Mainleus (DE); Sven Kerschbaum, Fürth (DE); Frank Volkmann, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 269 days.

(21) Appl. No.: 15/316,428

(22) PCT Filed: Jun. 10, 2014

(86) PCT No.: PCT/EP2014/062018
§ 371 (c)(1),
(2) Date: Dec. 5, 2016

(87) PCT Pub. No.: WO2015/188852
PCT Pub. Date: Dec. 17, 2015

(65) Prior Publication Data
US 2017/0163768 A1  Jun. 8, 2017

(51) Int. Cl.
*G06F 15/16* (2006.01)
*H04L 29/06* (2006.01)
*G06F 9/46* (2006.01)
*H04L 29/08* (2006.01)

(52) U.S. Cl.
CPC ............ *H04L 67/42* (2013.01); *G06F 9/466* (2013.01); *H04L 67/12* (2013.01)

(58) Field of Classification Search
CPC .......... G06F 9/466; H04L 67/12; H04L 67/42
USPC .................................................. 709/219, 227
See application file for complete search history.

(56) References Cited

U.S. PATENT DOCUMENTS

| | | | | |
|---|---|---|---|---|
| 8,027,349 | B2 * | 9/2011 | Brown | G05B 19/4185 370/399 |
| 8,924,595 | B1 * | 12/2014 | Joyce | G06F 11/261 710/5 |
| 9,241,007 | B1 * | 1/2016 | Witter | H04L 63/1433 |
| 2004/0230693 | A1 | 11/2004 | Baus et al. | |

(Continued)

FOREIGN PATENT DOCUMENTS

| | | | | |
|---|---|---|---|---|
| DE | 102008011191 A1 * | 8/2009 | | G06F 21/41 |
| DE | 102007062986 B4 | 12/2013 | | |

*Primary Examiner* — Phuoc H Nguyen
(74) *Attorney, Agent, or Firm* — Henry M. Feiereisen LLC

(57) ABSTRACT

An OPC UA session is interpreted as a single transaction according to the invention. In this case, a transaction means that all service calls, apart from the abovementioned calls, are initially only simulated and are not executed and the execution of the service calls is shifted to the termination of the transaction. Each operation inside a session is formally checked and then simulated. The simulated result or the result of the formal check is immediately sent to the client. The client therefore receives a preview of the result of the operations. If the client determines that one of the operations carried out would not lead to the desired result, the client can reject the operations. If the client wants the set operation to be carried out, the client terminates the current session.

10 Claims, 4 Drawing Sheets

(56) References Cited

U.S. PATENT DOCUMENTS

| | | | |
|---|---|---|---|
| 2004/0230694 A1 | 11/2004 | Baus et al. | |
| 2007/0067725 A1* | 3/2007 | Cahill | G05B 23/027 715/733 |
| 2010/0306313 A1* | 12/2010 | Mahnke | G06F 9/466 709/203 |
| 2013/0246368 A1 | 9/2013 | Parkinson et al. | |
| 2015/0058925 A1* | 2/2015 | Curry | H04L 63/08 726/3 |

* cited by examiner

METHOD AND APPARATUS FOR EXPANDING TRANSACTIONS IN OPC UA

CROSS-REFERENCES TO RELATED APPLICATIONS

This application is the U.S. National Stage of International Application No. PCT/EP2014/062018, filed Jun. 10, 2014, which designated the United States and has been published as International Publication No. WO 2015/188852.

BACKGROUND OF THE INVENTION

OPC UA (OPC Unified Architecture) is a standard industrial protocol of the OPC Foundation for manufacturer-independent communication for the exchange of machine data, particularly in process automation.

OPC UA is a relatively novel standard, in which the original focus was not on the control of an industrial facility, but rather on standardized information exchange, particularly between devices from different manufacturers.

In the meantime, OPC UA is also integrated directly in automation devices, so that the need for consistent writing of data arises.

In automation plants, there is the need to exchange process information (such as process values, measured values, parameters, control commands) between different devices. Here it is important that the information is transmitted between the users consistently and faultlessly. This is particularly important for data-modifying calls (i.e. the writing of variables).

In practice, consistency must be ensured over a plurality of individual calls in the plant. Thus, it may be the case that a modification in the process intervenes at a plurality of points in the process, the targets of the calls being different and having to be addressed by different calls.

Other reasons for the need for a plurality of different, but logically coherent calls would for example be:
different security settings,
different type of call (write, method call),
organizational reasons.

In OPC UA, variables are considered individually (even within what is known as a WRITE call with a plurality of variables); the server shares these variables with the client by means of individual status codes (per variable). Other options are not provided in the specification.

The information model specified by the OPC UA is no longer only a hierarchy made up of folders, items and properties. It is what is known as a full mesh network made up of nodes, using which, in addition to the user data of a node, meta information and diagnostic information are also represented. A node is similar to an object from object-oriented programming. A node can have attributes, which can be read (Data Access DA, Historical Data Access HDA). It is possible to define and to call methods. A method has calling arguments and return values. The method is called by a command. Furthermore, events are supported, which can be sent (AE, DA DataChange), in order to exchange certain information between devices. An event has a time of receipt, a message and a severity level, inter alia. The abovementioned nodes are used both for user data and for all other types of meta data. The thus modeled OPC address space also now contains a type model, using which all data types are specified.

In OPC UA, a session concept (session) is known, which is implemented using special service calls (BeginSession, ActivateSession, EndSession). There may be a plurality of sessions which exist simultaneously on a server. However, within an OPC UA connection, there is always only one such session active at a time. Sessions are used inter alia to assign a user or a role uniquely.

Without violating the OPC UA standard, a client and a server (which are tailored to one another) could agree that the server regards a Write call as exactly one consistent write operation and only accepts this call as a whole or rejects this call as a whole.

However, this mechanism is not—as described above—valid in general, but rather functions only
if client and server are tailored to one another. Client and server must exchange the information that they are tailored to one another, i.e. this information must be transmitted e.g. in the logon protocol,
if there is exactly one modifying call and/or
if the targets of the write operations are located on the same target system (aggregating servers could not be handled hereby).

As already stated above, this is not sufficient in practice, as consistent operations often cannot be covered using a single modifying call.

It is therefore the object of the invention to specify a method and an apparatus which overcomes the above-described problems.

The described object is achieved by means of a method and an apparatus according to one of the independent patent claims.

A method is claimed for communication between an OPC UA client and an OPC UA server of a client/server system using the OPC UA communication protocol, OPC UA calls being used for the interaction of the client with the server, wherein the communication is executed in a session-based manner and after opening a session, at least one OPC UA call is received and stored by the server and the execution of the OPC UA call is initially simulated at the server and the result of the simulation is initially transmitted to the client as response.

According to the invention, an OPC UA session is regarded as a single transaction. A transaction begins with the service call for CreateSession or ActivateSession. A transaction is ended (with execution) by the service call CloseSession or ActivateSession. A transaction is canceled (i.e. without execution) with the service call Cancel.

That means: the command ActivateSession ends a previous transaction (with execution) and begins a new transaction.

Transaction in this context means that all service calls up to the abovementioned one are only simulated and not executed and the execution of the service calls is deferred to the ending of the transaction.

Each operation within a session is formally checked and subsequently simulated. The simulated result or the result of the formal check is sent to the client immediately. The client therefore receives a preview of the result of the operations.

If the client determines that one of the operations carried out would not lead to the desired result, they can discard the operations. If the client wants the set operation to be executed, then the client ends the current session. Should a further set operation be created, the client ends the session. The set operation is executed and the session is set to the original state. If no further set operation should be created, the client ends the session. Server and client agree when the connection is established about the activation of the suggested mechanism.

As stated above, the problem of the consistent data-modifying set operation is not currently addressed by OPC UA. This will increasingly be an important requirement in the future, particularly in communication between automation systems.

This invention solves precisely this problem.

In a surprising manner, the sessions defined by OPC UA are expanded by the capability to carry out transaction-oriented set operations. This is achieved in that the execution of the operations within a session is deferred to the end of the session. All calls which are carried out within such a session receive the normal service results thereof. These are merely afflicted with the uncertainty that they are only simulated. Nothing has to be changed in the fundamental mechanism of the calls within a session.

By contrast with the already known transactions, this method does not have the option of a rollback, that is to say a reversal of the operation execution. Upon closer consideration, one determines that this is often neither necessary nor implementable or sensible for automation technology. When a valve is first opened, the state prior to the opening of the valve can no longer be produced, because e.g. liquid has already escaped from a container. That is to say, in addition to the closing of the valve, that is to say the production of the initial state "from the perspective of the valve" another step (cleanup) must also be carried out. Therefore, a rollback known from the database environment is not possible in this example.

BRIEF DESCRIPTION OF THE DRAWING

In the following, the invention is illustrated by figures and explained further. In the figures

DETAILED DESCRIPTION OF PREFERRED EMBODIMENTS

A preferred exemplary embodiment is explained in the following. This example should only explain, but not limit the invention.

The exemplary task, which the automation facility should execute, is the mixing of a green color from yellow and blue liquids. There are three OPC UA servers in the plant: one server UA-S3 at the blue tank B, one server UA-S2 at the yellow tank Y and one server UA-S1 at the mixing tank G, in which the green color is mixed. For the correct green mixture, the valves V1, V2 of the yellow and blue tanks must be opened simultaneously. If the following fault then occurs: one valve cannot be opened correctly, first all open supply valves V1, V2 must be closed again, and then at the mixing tank G the valve R must be opened in the disposal direction, in order to dispose of the collected fluid. The control of the servers UA-S1, UA-S2 and UA-S3 takes place by means of the client UA-C.

Although a rollback would be desirable here, it is not possible. Due to the opening of the valves, liquid has already escaped in the two upper tanks B, Y and flowed in the lower tank G. Only one defined state can be produced again for the valves V1, V2. Additional work steps in order to reproduce the original state, that is to say for example the disposal of the liquid that has entered into the lower tank G, cannot be mapped and must be solved programmatically.

Figure 2:
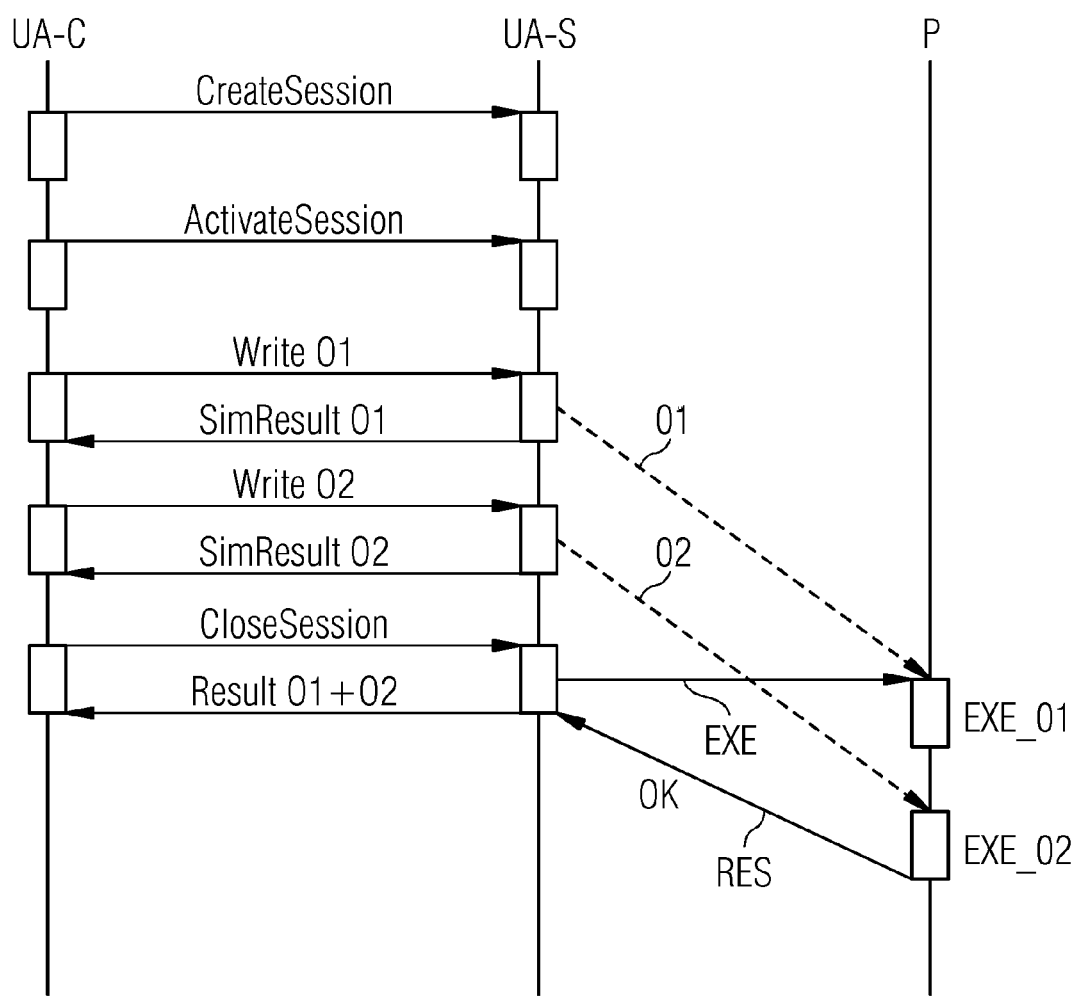
FIG. 2 shows an exemplary communication exchange for successful execution of a task/set of operations according to the exemplary embodiment 1.
Figure 3:
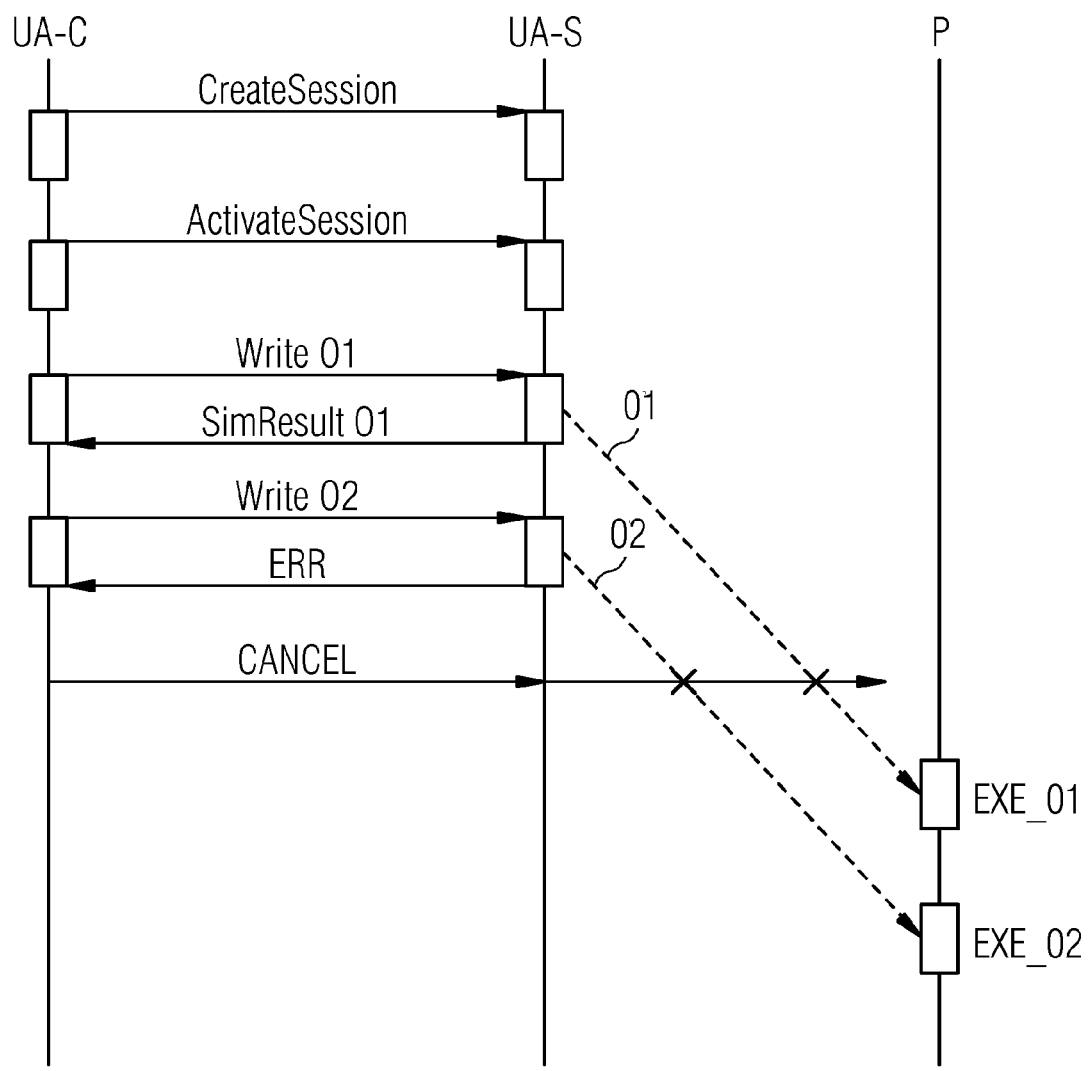
FIG. 3 shows an exemplary communication exchange for the occurrence of an interruption request after executing a task/set of operations according to a second exemplary embodiment.
Figure 4:
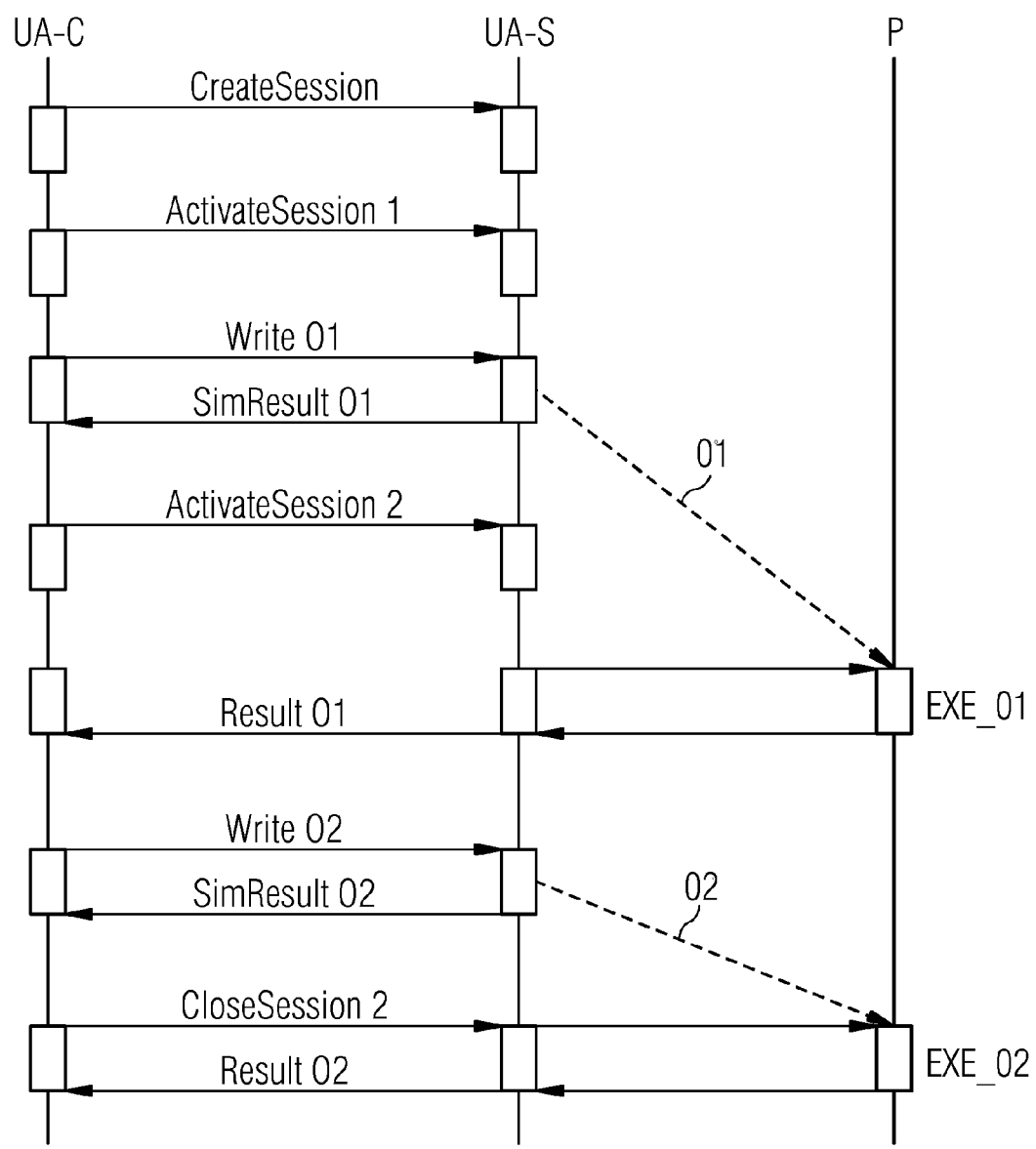
FIG. 4 shows a further exemplary communication exchange for the occurrence of a session change according to a third exemplary embodiment.

In FIGS. 2 to 4, the communication processes between client UA-C and the servers UA-S1, UA-S2, UA-S3 according to the invention are shown by way of example.

A normal procedure for a transaction with a plurality of write commands is described in a first preferred exemplary embodiment 1 of FIG. 2.

A client UA-C connects to the server UA-S and opens a session by means of the command CreateSession, CreateSession, to a server UA-S. A session in the server UA-S is created as a result of the command.

When establishing the connection, it indicates that this session is a session in the sense of the invention. The new session consequently becomes valid.

In a next step, the client calls the command ActivateSession. An empty transaction is begun in that the client sends a Write call, Write01. The Write call is formally checked. In the event of an error, the client receives a corresponding response.

If no error occurs, the Write call is simulated, the client receives the simulated result and the server stores the Write call.

If the client sends a Call command—not illustrated in the figure—this is likewise formally checked initially.

In the event of an error, the client receives a corresponding response. Otherwise, the Call command is simulated, the client receives the simulated result and the server stores the Call call. These are stored on the server UA-S in the sense of the invention. The client UA-C in each case receives the simulated results, SimResult01, SimResult02 for Write01 and Write02.

Figure 1:
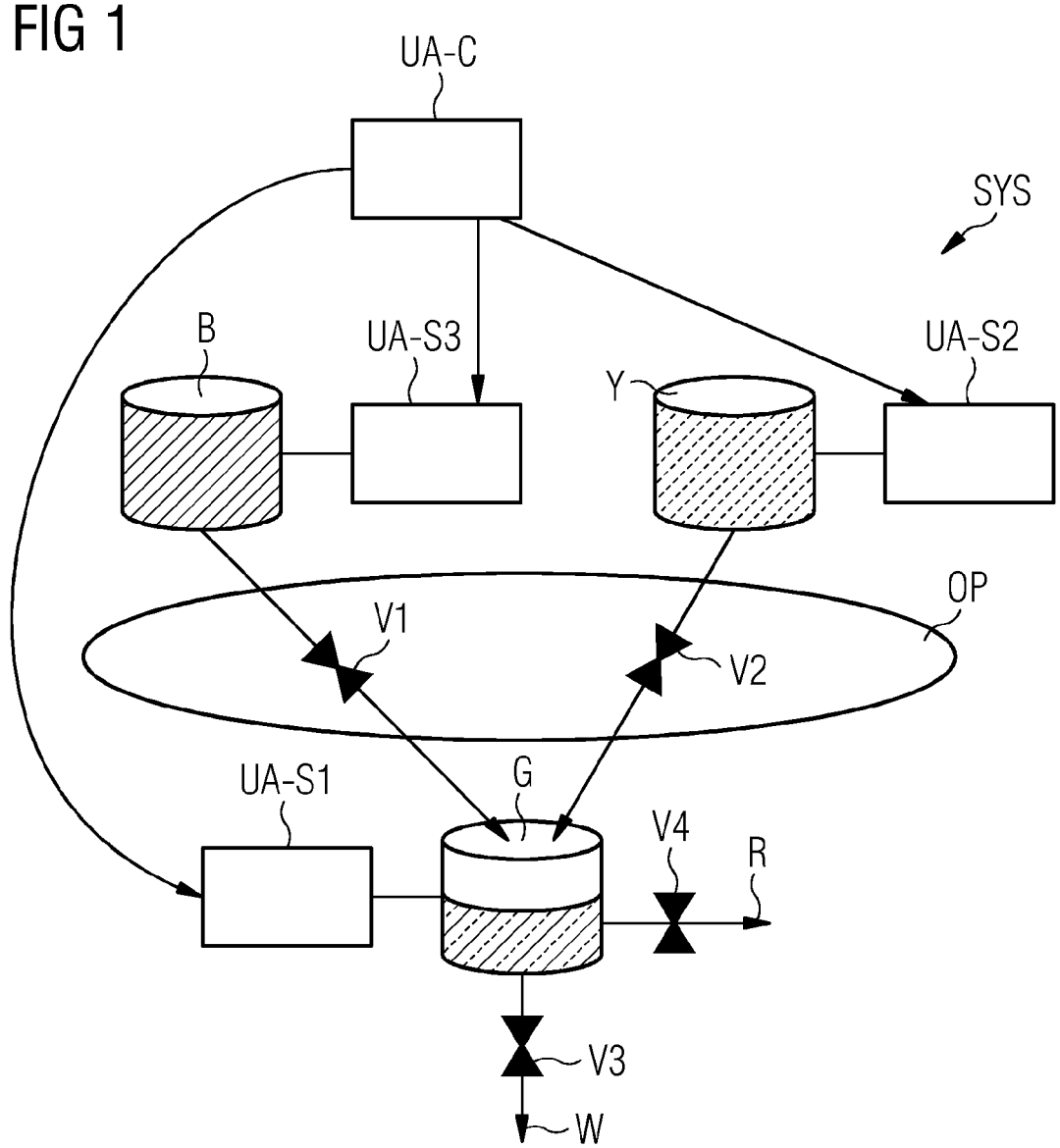
FIG. 1 shows an exemplary application of the invention in the automation environment.

Finally, the client calls the command CloseSession. The previously collected calls Write and, if appropriate, Call are then first executed on the productive system P. As a result, the execution of the write commands Write01 and Write02 is initiated, that is to say with respect to the example in FIG. 1, the valves V1, V2 are opened. The previously only simulated operations for opening valve V1, Write01, and for opening valve V2, Write02, are executed.

The client UA-C receives the collection result about the executed operations EXE_01, EXE_02 in the CloseSession response Result01+02. The session is subsequently ended.

In this case, both valves V1 and V2 were successfully opened, thus the client receives a positive response OK after execution EXE_01, EXE_02.

In a further exemplary embodiment 2 of FIG. 3, it is described how the client UA-C can cancel the transaction at any time, by means of CANCEL, without the stored operations being executed.

The client UA-C connects to the server UA-S and calls a new session by means of the command CreateSession. A session is created in the server as a result of the command.

The client then calls the command ActivateSession. The session therefore becomes valid, an empty transaction is begun in that the client sends a Write call, Write01.

The Write call is formally checked, in the event of an error, the client receives a corresponding response.

After the formal check has taken place, the Write call is simulated, and at the end, the client receives the simulated result of the Write call, SimResult01. The server stores the write call.

Instead of a Call command, the client UA-C now sends a Cancel command. The session is consequently canceled. The calls (Write) collected in the server are not executed and discarded.

Finally, the client UA-C calls the command CloseSession. The session is ended without the write commands having been executed.

In a final exemplary embodiment 3 of FIG. 4, it is described how the client UA-C begins a further transaction within a session:

As in the two other exemplary embodiments, a client UA-C connects to the server UA-S and calls a new session by means of the command CreateSession. A session is created in the server as a result of the command.

The client UA-C then calls the command ActivateSession. The session therefore becomes valid, an empty transaction is begun in that the client UA-C sends a Write call.

The Write call is formally checked.

In the event of an error, the client UA-C receives a corresponding response.

If no error has occurred, the Write call is simulated, the client receives the simulated result and the server stores the Write call. The stored operations are executed. The list of stored calls is subsequently empty. Thus a new transaction begins.

The overall result of the operations is sent to the client.

The client sends a Write command, which is formally checked. In the event of an error, the client receives a corresponding response.

The Write call is simulated, the simulated result is transmitted to the client and the server stores the Write call.

In the next step of the exemplary embodiment, the client calls a Call command, this is formally checked. In the event of an error, the client receives a corresponding response.

Then the Call call is simulated and the simulated result is transmitted to the client. The server stores the Call call.

In a last step, the client calls CloseSession. The collected calls (Write, Call) are then executed on the server. The client receives the collection result about the executed operations in the CloseSession response. The session is then ended.

The invention claimed is:

1. A method for communicating process information in an automation plant between a client and a server of a client/server system using the OPC UA (Open Platform Communication Unified Architecture) communication protocol wherein the client uses OPC UA calls for interaction with the server, said method comprising:

opening a communication session between a client and a server;

the server receiving and storing a first and at least one second OPC UA service call from the client after opening the communication session with the client;

the server initially only simulating execution of the first OPC UA service call at the server in the communication session, without the server actually executing the first OPC UA service call, and the server then only simulating the at least one second OPC UA service call in the communication session using for simulating the at least one second OPC UA service call results of the first OPC UA service call;

the server transmitting a result of the simulation of the first and the at least one stored second OPC UA service call to the client in response to the at least one second OPC UA service call, and the server actually executing the first and the at least one second simulated OPC UA service call only when receiving from the client an OPC UA special service call for closing the communication session.

2. The method of claim 1, further comprising ending the communication session using an OPC UA special service call for opening a new communication session.

3. The method of claim 1, further comprising terminating the communication session before execution of the first simulated OPC UA service call, thereby preventing the first and any subsequent simulated OPC UA service call to be executed at the server.

4. The method of claim 1, further comprising:

the server sending, after execution of the first and the at least one second OPC UA service call in said communication session, a corresponding result call to the client including results of all OPC UA service calls executed by the server in said communication session.

5. A client device adapted for communication with a server in a client/server system using the OPC UA (Open Platform Communication Unified Architecture) communication protocol, said client device transmitting service calls and special service calls to the server, said client device comprising:

a client, said client adapted to open a communication session with a server using an OPC UA special service call; and a simulation processor, said simulation processor adapted for receiving and storing at least a first OPC UA service call transmitted by the client to the server during said communication session, and for initially only simulating execution of the stored first OPC UA service call during said communication session, without the server actually executing the first OPC UA service call, the simulation processor further adapted for receiving and storing at least one second OPC UA service call from the client in said communication session, with the simulation processor using the result of the Initial simulation of the first OPC UA service call to initially simulate the execution of the at least one second OPC UA service call in said communication session and providing the result of the initial simulation of the stored first and the at least one second OPC UA service call to the client in response to the stored at least one second OPC UA service call, wherein the server actually executes the first and the at least one second simulated OPC UA service call only when receiving from the client an OPC UA special service call for closing the communication session.

6. The client device of claim 5, wherein the client is adapted to end said communication session in response to an OPC UA special service call for opening a new communication session.

7. The client device of claim 5, wherein a result call Including results of all service calls executed by the server in said communication session is sent to the client after the server executes at least one OPC UA service call in said communication session.

8. A server device adapted for communication with a client in a client/server system using the OPC UA (Open Platform Communication Unified Architecture) communication protocol, said server device comprising:

a server adapted for receiving service calls and special service calls from the client, said server being adapted to open a communication session in response to a special service call from the client; and a simulation processor adapted for receiving and storing a first and at least one second OPC UA service call received from the client by the server in said communication session, and further adapted for initially only simulating execution of the stored first OPC UA service call during said communication session, without the server actually executing the first OPC UA service call, and for using a result of the initial simulation of said first OPC UA service call to initially simulate the execution of the at least one second OPC UA service call in said communication session, wherein the result of the initial simulation of the first and the at least one second stored OPC UA service call is provided to the client as a response to the stored at least one second OPC UA service call, and wherein the server actually executes the first and the at least one second simulated OPC UA service call only when receiving from the client an OPC UA special service call for closing the communication session.

9. The server device of claim 8, wherein the simulation processor is adapted to end said communication session in response to an OPC UA special service call from the client for opening a new communication session.

10. The server device of claim 8, wherein a result call including results of all calls executed by the server in said communication session is sent to the client after the server executes at least one OPC UA service call in said communication session.

* * * * *